United States Patent (10) Patent No.: US 8,645,311 B2
Lahiri et al. (45) Date of Patent: Feb. 4, 2014

(54) CRITICAL THRESHOLD PARAMETERS FOR DEFINING BURSTS IN EVENT LOGS

(75) Inventors: Bibudh Lahiri, Jersey City, NJ (US); Fabian Moerchen, Rocky Hill, NJ (US); Ioannis Akrotirianakis, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 281 days.

(21) Appl. No.: 13/286,473

(22) Filed: Nov. 1, 2011

(65) Prior Publication Data

US 2012/0246109 A1 Sep. 27, 2012

Related U.S. Application Data

(60) Provisional application No. 61/467,529, filed on Mar. 25, 2011.

(51) Int. Cl.
*G06F 17/00* (2006.01)

(52) U.S. Cl.
USPC ............................................. 706/58; 370/241

(58) Field of Classification Search
None
See application file for complete search history.

(56) References Cited

U.S. PATENT DOCUMENTS

| | | | |
|---|---|---|---|
| 2009/0077148 A1* | 3/2009 | Yu et al. | 708/300 |
| 2009/0086755 A1* | 4/2009 | Chen et al. | 370/468 |
| 2009/0319838 A1* | 12/2009 | Jones, Jr. | 714/704 |

OTHER PUBLICATIONS

Yunyue Zhu and Dennis Shasha. 2003. Efficient elastic burst detection in data streams. InProceedings of the ninth ACM SIGKDD international conference on Knowledge discovery and data mining (KDD '03). ACM, New York, NY, USA, 336-345.*
Lahiri et al. Finding Critical Thresholds for Defining Bursts. Data Warehousing and Knowledge Discovery Lecture Notes in Computer Science. 13th International Conference, DaWaK 2011, Toulouse, France, Aug. 29-Sep. 2, 2011. Proceedings. vol. 6862, 2011. pp. 484-495.*
Gabriel Pui Cheong Fung, Jeffrey Xu Yu, Philip S. Yu, and Hongjun Lu. 2005. Parameter free bursty events detection in text streams. In Proceedings of the 31st international conference on Very large data bases (VLDB '05). VLDB Endowment 181-192.*
Bulut, A.; Singh, A.K., "A unified framework for monitoring data streams in real time," Data Engineering, 2005. ICDE 2005. Proceedings. 21st International Conference on , vol., no., pp. 44,55, Apr. 5-8, 2005.*

* cited by examiner

*Primary Examiner* — Jeffrey A Gaffin
*Assistant Examiner* — David H Kim

(57) ABSTRACT

Systems and methods for determining critical thresholds on a number of events (k) and a window length (t) for properly defining a burst of events in a data stream. A new coverage metric $C_{k,t}$ is defined and used in the determination, where the coverage metric $C_{k,t}$ is defined for a particular pair (k,t) as a fraction, with the numerator defined a number of events that occur within some (k,t)-bursty window and the denominator defined as the total number of events (n) that occurred along the entire time span being analyzed. Coverage metric $C_{k,t}$ is monotonic non-increasing in k and monotonic non-decreasing in t, allowing for a divide-and-conquer search strategy to be used to find the critical threshold pairs (k*, t*).

10 Claims, 8 Drawing Sheets

CRITICAL THRESHOLD PARAMETERS FOR DEFINING BURSTS IN EVENT LOGS

CROSS-REFERENCE TO RELATED APPLICATIONS

This application claims the benefit of U.S. Provisional Application No. 61/467,529, filed Mar. 25, 2011 and herein incorporated by reference.

TECHNICAL FIELD

The present invention relates in general to the field of analyzing bursts of events in a data stream (such as bursts of error codes) and, more particularly, to a method of defining thresholds used to determine the presence of event bursts in the first instance.

BACKGROUND OF THE INVENTION

A burst is generally defined as a window in time during which an event shows an usually high frequency of occurrence. For applications where data arrives as a time series or a stream, a burst indicates a period of time when something of interest took place. For example, in a pay-per-click revenue model, a burst in clicks to an online advertisement may indicate a click fraud. Over the Internet, network intrusions often exhibit a bursty traffic pattern; that is, the traffic from the attacked to the victim shows a sudden deluge, then does the damage and then fades away. In another field of endeavor, a Gamma ray burst might indicate an interesting phenomenon in astrophysics.

Detecting bursts in a time series or streaming data (e.g., Ethernet and Internet traffic, multimedia, disk traffic, log messages or the like) has drawn significant attention in the research community. In particular, recent attention has been focused on developing efficient algorithms for burst detection in the first instance.

Labeling a window in time as bursty requires the definition of at least two thresholds: a first threshold defining a particular number of events (k) and a second threshold defining a time span (t) of a window along which the events are viewed. A window is then defined as "(k,t)-bursty" if at least k events occur in a time interval of at most t. For a time window of a given length t, to know the number of events k that should be defined as "unusually high" requires a knowledge of how many events to typically expect in a window of length t. Similarly, for a given k, in order to define a certain t as "unusually short", a knowledge of how long it typically takes for k events to occur needs to be known.

An article entitled "Efficient elastic burst detection in data streams" by Y. Zhu et al. appearing in *Proceedings of the Ninth ACM SIGKDD International Conference on Knowledge Discovery and Data Mining (KDD)*, pp. 336-345 (2003) considers the problem of "elastic" burst detection, where the authors propose the use of different event thresholds for different window sizes. In this case, a different event threshold is set for each unique window size, and identified windows over the time-series when an aggregate function (sum) computed over the window exceeds the corresponding threshold. The concept of elastic windows, i.e., windows of multiple sizes, was introduced since for most applications, the proper window size is not known a priori. The Zhu et al. approach utilizes a Shifted (binary) Wavelet Tree (SWT) data structure and builds on a time series of length n, with a complexity of $O(n+j)$, where j in this case is the output size—the total number of windows where (true and false) bursts were reported.

While useful, it depends on some assumptions that may not always be true (such as windows of the 'same size' always utilize the same burst threshold k). The complexity also remains high for a large time span, which is a typical scenario in burst detection applications.

Thus, a need remains for an approach to determining critical threshold values for both k and t that are likely to define the existence of a burst along a data stream. Moreover, the knowledge of the critical values k and t alone will give further insight into the structure of the data and may help in the understanding of the behavior of the underlying system.

SUMMARY OF THE INVENTION

The needs remaining in the prior art are addressed by the present invention, which relates to a method of defining critical thresholds for both a number of events (k) and a window size (t) that are appropriate for defining the presence of bursts in a data stream.

In accordance with the present invention, critical threshold pairs (k*,t*) are developed for the number of events (k) and the time length of a window (t) associated with those situations where the data is unusually bursty (based upon using a two-dimensional search). Both the event parameter k and time parameter t are defined as being monotonic, exploiting the ability to search the two-dimensional space logarithmically.

The pair (k*,t*) found from this sequence is then defined as the "critical threshold" pair that can thereafter be used to analyze an incoming data stream and detect the presence of bursts; rather than "guess" at the proper threshold values for k and t (as was usually done in the past), the methodology of the present invention provides useful threshold values that have a correspondence to the actual events being evaluated.

The methodology of the present invention proposes the use of a new metric, defined as "coverage", that is used to analyze a sequence of events and search for the best candidates for the critical threshold pairs (k*, t*). As discussed in detail below, the coverage metric $C_{k,t}$ is defined for a particular pair (k,t) as a fraction, with the numerator defined a number of events that occur within some (k,t)-bursty window and the denominator defined as the total number of events (n) that occurred along the entire time span being analyzed. The following expression defines coverage:

$$C_{k,t} = \frac{N_{k,t}}{n}.$$

Using this metric, a divide-and-conquer search methodology is employed along both the k dimension and the t dimension to select critical threshold pairs (k*, t*). Since the coverage metric will have essentially the same value under usual conditions (regardless of the specific values of k and t), since a similar number of events will occur in generally each window, any coverage parameter $C_{k,t}$ that is "abruptly different" from its neighboring values is defined as being associated with a particular (k,t) pair where a burst situation has occurred. In this instance of "abruptly different", therefore, the particular pair (k,t) is defined as a critical threshold pair (k*, t*).

Inasmuch as it would be time-consuming to determine each potential coverage parameter and perform a comparison against each neighbor in both dimensions (a complexity of O(KT), where K is the total number of all events and T is the total time span), a divide-and-conquer search is proposed in accordance with the present invention, where intervals within both K and T are systematically probed and evaluated. It is the monotonic properties of C that allow such a divide-and-conquer search to be used in this instance. As discussed below, either a deterministic heuristic or a random search heuristic may be utilized, with either shown to have a complexity on the order of O(log K log T), far less than the straightforward, naïve value O(KT).

In summary, one aspect of the present invention provides a method of determining critical thresholds on a number of events (k) and a window length (t) for defining a burst of events in a data stream, the method comprising the steps of: defining minimum and maximum values of both k and t; calculating a coverage metric $$C_{k,t} = \frac{N_{k,t}}{n},$$

where $N_{k,t}$ is a number of events occurring in some (k,t)-bursty window and n is the total number of events in a data stream; searching for a $C_{k,t}$ that is abruptly different from its neighboring values (neighboring values defined as looking at both k and k+d, where d may equal 1, or another somewhat larger value (indicating an analysis of a larger neighborhood)); and identifying the (k,t) pair for that $C_{k,t}$ which is abruptly different as a critical threshold pair (k*,t*) defining a burst of events.

Another aspect of the invention provides a computer system for determining critical thresholds on a number of events (k) and a window length (t) to properly defining a burst of events in a data stream the system comprising: a module for defining minimum and maximum values of both k and t; a module for calculating a coverage metric $$C_{k,t} = \frac{N_{k,t}}{n},$$

where $N_{k,t}$ is a number of events occurring in some (k,t)-bursty window and n is the total number of events in a data stream; a module for searching for a $C_{k,t}$ that is abruptly different from its neighboring values; and a module for identifying the (k,t) pair for that $C_{k,t}$ which is abruptly different as a critical threshold pair (k*,t*) defining a burst of events.

Furthermore, an additional aspect of the invention provides a program storage device readable by machine, tangibly embodying a program of instructions executable by the machine to perform method steps for determining critical thresholds on a number of events (k) and a window length (t) for properly defining a burst of events in a data stream by: defining minimum and maximum values of both k and t; calculating a coverage metric $$C_{k,t} = \frac{N_{k,t}}{n},$$

where $N_{k,t}$ is a number of events occurring in some (k,t)-bursty window and n is the total number of events in a data stream; searching for a $C_{k,t}$ that is abruptly different from its neighboring values; and identifying the (k,t) pair for that $C_{k,t}$ which is abruptly different as a critical threshold pair (k*,t*) defining a burst of events. It is to be noted that there may be several (k*,t*) pairs that qualify as a critical threshold pair.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
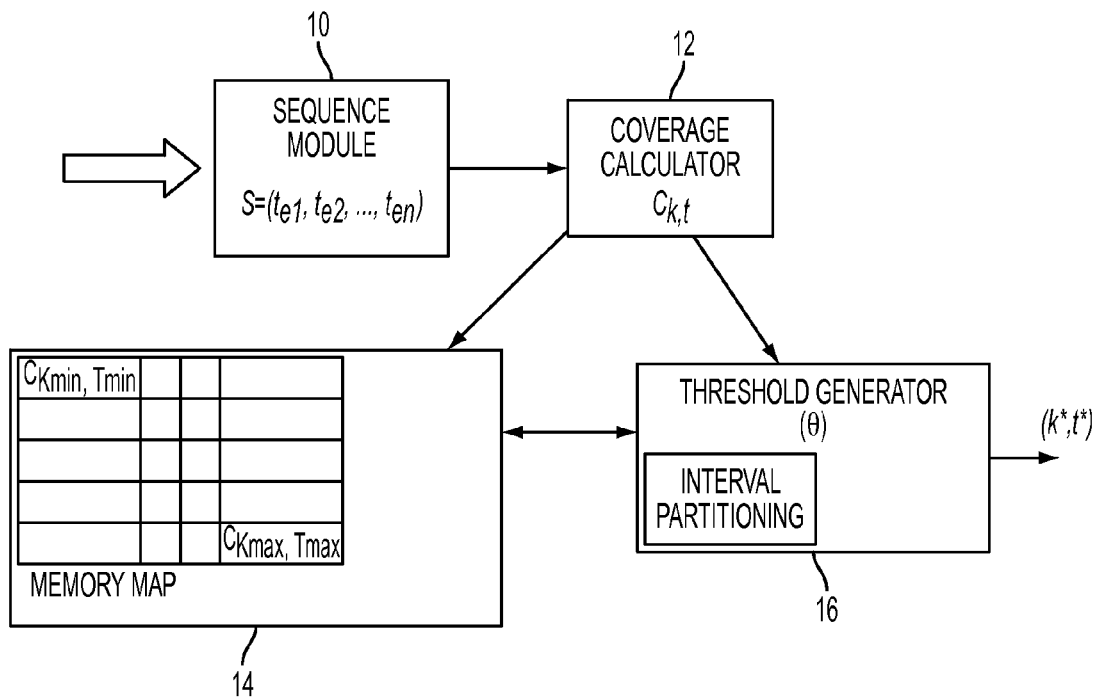
FIG. 1 is block diagram of a computer-based system for generating critical threshold pairs (k*, t*) in accordance with the present invention.

A burst, for the purposes of the present invention, is defined as an usually high frequency of occurrences of an event in a time window. A burst is interesting in many monitoring applications that give rise to temporal data, since a burst often indicates an unusual or anomalous activity. While the problem of detecting bursts from time series data has been well addressed, the question of what choice of thresholds (with respect to both the number of events and window length) renders a window "unusually bursty" remains a relevant one.

In accordance with the present invention, it is proposed to define critical values for both the "event" and "window length" thresholds, defined as k* and t*, respectively. Since for most applications there is no a priori determination of what combination of values is appropriate, the range of possible values for either threshold can be very large. As described in detail below, the methodology of the present invention proposes the use of a two-dimensional search strategy, one dimension being associated with the proper threshold k for the number of events, and the other dimension being associated with the proper length t of the time window over which the events are viewed.

For the purposes of the present invention and as mentioned above, a window is defined as (k,t)-bursty if at least k events occur in a time interval of length no greater than t. Given a specific pair (k,t), and a sequence of timestamps of n events, a "coverage" metric (denoted $C_{k,t}$) is defined as the fraction of the total n events that are included in any given (k,t)-bursty window, that is:

$$C_{k,t} = \frac{N_{k,t}}{n}.$$

where $N_{k,t}$ is defined as the number of events occurring in some (k,t)-bursty window. It is the creation and utilization of this coverage metric $C_{k,t}$ (and its monotonistic properties) that allows for an efficient search to performed, as described below. The value of $C_{k,t}$ will always be in the interval [0,1]. It is to be noted that a single event can be part of more than one (k,t)-bursty window.

The present invention, as defined in detail below, provides a method of identifying critical pairs (k*, t*) associated with the condition where coverage metric $C_{k*,t*}$ is "abruptly different" from values of coverage $C_{k,t}$ for pairs (k,t) in the neighborhood of (k*, t*). This then implies that having k* events in a window of at most t* is not a regular phenomenon, yet there are some rare situations when this has happened. For the purposes of the present invention, "abruptly different" is a user-defined quantity that may be adjusted to provide different levels of identifying bursty behavior.

For a given pair (k,t), if the value of $C_{k,t}$ is relatively close to 1, that means that the number events $N_{k,t}$ is very close to the total number of events n—a result that is not of interest in trying to determine the proper thresholds for defining bursty conditions. Alternatively, if the value of $C_{k,t}$ is very close to 0, that means that hardly any events occurred during that specific coverage period and it implies that having k events during time interval t is highly unusual and demands attention in terms of defining the proper threshold values.

For example, presume that a time interval of 21 seconds is being used as the window length; that is, t=21. If it was found that $C_{2,21}$=0.29, but $C_{3,21}$=0.0125, it would appear that a specific event has about a 30% chance of being seen twice (k=2) in a time period of twenty-one sections (t=21), but a less than 2% chance of being part of a triplet (when k=3)—the value of $C_{3,21}$ is said to be "abruptly different" from $C_{2,21}$. Therefore, it can be concluded that the presence of a triplet is (23 times) more likely to qualify as a burst. At a high level, therefore, an analysis of the values for different coverage parameters will flag certain specific (k,t) pairs that may qualify as bursty.

Also, it is to be noted that the coverage parameter $C_{k,t}$ is monotonically non-increasing in k and non-decreasing in t, which is of benefit in determining the critical thresholds in accordance with the present invention. That is, as the value of k increases, $C_{k,t}$ cannot increase; similarly, as the value of t increases, $C_{k,t}$ cannot decrease. The proofs of the monotonicity of $C_{k,t}$ are presented in a later portion of the specification. For the purposes of the following explanation, this property is presumed.

For a given pair (k,t), the coverage value $C_{k,t}$ can be computed by making a single pass through the data. However, if the range of possible values for k and t have sizes K and T, respectively, then evaluating $C_{k,t}$ at every point in the two-dimensional space develops a computational overload of O(KT). In many real world applications, this overload is problematic, since k may take on values of between 2 and 1000, and t may range from a few seconds or minutes to a few hours. Thus, while the straightforward computation of each coverage value will provide the desired solution, it is not considered to be sufficiently efficient to be practical.

Thus, it is proposed in accordance with the present invention to further leverage the monotonistic properties of this defined metric $C_{k,t}$ and utilize a divide-and-conquer search strategy to arrive at a solution with a computational overload of O(log K log T).

It will be readily understood that the components of the present invention, as generally described and illustrated in the associated drawings, may be arranged and designed in a wide variety of different configurations. Thus, the following more detailed description of the embodiments of the apparatus, system and method of the present invention, as represented by FIGS. 1-6 is not intended to limit the scope of the invention as claimed, but is merely representative of the selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors or other discrete components. A module may also be implemented in programmable hardware devices such as field programmable gate arrays, programmable logic arrays, programmable logic devices, or the like.

Modules may also be implemented in software for execution by various types of processors. An identified module of executable code may, for instance, comprise one or more physical or logical blocks of computer instructions which may, for instance, be organized as an object, procedure or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The following sections will first define the "problem statement" associated with determining thresholds, then provide a one-dimensional analysis of the different divide-and-conquer methods of finding the critical threshold values (deterministic vs. randomized), expanding into the two-dimensional situation.

Problem Statement:

It is presumed that there is a sequence of events ($e_1$, $e_2$, $e_3$, ... $e_n$) that are generated in some process that has been continuously monitored for a given length of time T. Let $t_e$ be defined as the point in time at which event "e" occurs, yielding a corresponding sequence S of times, where S=($t_{e1}$, $t_{e2}$, ..., $t_{en}$). There are presumably windows in time where these events show a bursty pattern; that is, a large number of events clustered within a short interval of time. For the purposes of the present invention, and as discussed above, a window over S is defined as (k,t)-bursty if at least k events occur in a time interval no greater than t. As before, the coverage $C_{k,t}$ is defined as follows:

$$C_{k,t} = \frac{N_{k,t}}{n},$$

where $N_{k,t}$ is defined as the actual number of events that fall within a (k,t)-bursty window and n is defined as the total number of events.

Again, the coverage metric $C_{k,t}$ is defined in this manner since bursty windows may indeed overlap with each other, and this definition allows for that occurrence since an event that is included in multiple bursty windows contributes only once (i.e., the value "1") to the numerator of this relationship. The size n of sequence S as appears in the denominator aids in understanding how significant the bursts are in a given sequence. This value also becomes useful in comparing one sequence with another.

In accordance with the present invention, a methodology has been developed that identifies a pair of critical thresholds: k on the number of events, and t on the time length of a window as occurring when the ratio $$\frac{C_{k-1,t}}{C_{k,t}}$$

is high. This is interpreted as stating that many events are part of a (k−1, t)-bursty window, but not many events are part of a (k,t)-bursty window. It is considered as the conventional, non-bursty situation where the ratio $$\frac{C_{k-1,t}}{C_{k,t}}$$

is close to the value one. As the ratio grows above the values of, for example 2 or 3 (or higher), this becomes indicative of a bursty situation.

In order to find these critical values of k and t in accordance with the present invention, the following problem is analyzed:

Given a sequence S, and a user-defined parameter θ>1, find a set α={(k*,t*)} such that $$\frac{C_{k*-1,t*}}{C_{k*,t*}} \geq \theta$$

for any pair (k*, t*)∈α, where α⊂[$K_{min}$+1, $K_{max}$]×[$T_{min}$, $T_{max}$], with $K_{min}$ and $K_{max}$ defined as the minimum and maximum possible values for k, respectively (and known a priori), and $T_{min}$ and $_{iTmax}$ defined as the possible minimum and maximum values of t (also known a priori). The pair (k*,t*) found from this sequence is then defined as the "critical threshold" pair that can thereafter be used to analyze an incoming data stream and detect the presence of bursts; rather than "guess" at the proper threshold values for k and t (as was usually done in the past), the methodology of the present invention provides useful threshold values that have a correspondence to the actual events being evaluated.

FIG. 1 contains a block diagram of the modules that can be utilized to configure a system for studying a data stream and defining burst threshold values in accordance with the present invention. As shown, an incoming data stream (or multiple data streams, perhaps) is applied as an input to a sequence module 10 that creates a sequence S which is a set of timestamps associated with the occurrence of a specific (pre-defined) event. As shown here and described below, S=($t_{e1}$, $t_{e2}$, $t_{e3}$, ... $t_n$), where $t_i$ is the timestamp associated with event $e_i$, and |S|=n (the total number of events).

As will be described in detail below, a coverage metric $C_{k,t}$ can be calculated for each pair (k,t) associated with sequence S, shown as coverage calculator module 12 in FIG. 1. In a preferred embodiment of the present invention, these values are all calculated initially and stored in a (k,t)-organized, two-dimensional memory map 14. Obviously, if there is more than one event "e" being evaluated, this process of calculating and storing coverage metrics is repeated for each e.

The indicator of a bursty situation, where the coverage metric is "abruptly different", is determined by using the above-defined coverage ratio and associated parameter θ. A threshold definition generator module 16 utilizes these values and, with input from memory map 14, generates the desired critical threshold pair(s) (k*, t*). As described in detail below, threshold definition generator module 16 includes a interval partitioning module 18, which performs the parsing used in the divide-and-conquer process of the present invention (either deterministic (creating sub-intervals of essentially equal size), or random (creating sub-intervals of random size).

For the sake of clarity, the one-dimensional version of this problem will first be analyzed (e.g., studying for critical threshold values of k* while holding t constant), and then transition into the two-dimensional solution.

Assuming a fixed value of the maximum window length t, the above problem statement reduces to the following:

For a fixed value t, and a user-defined parameter θ>1, find all critical threshold values k* such that $$\frac{C_{k*-1,t}}{C_{k*,t}} \geq \theta.$$

It has been found through experimentation with data generated from complex medical equipment that the relation $$\frac{C_{k-1,t}}{C_{k,t}}$$

remains close to unity value most of the time. However, for a very few combinations of k and t, it attains values like 2 or 3 (or higher). These are the combinations that are of interest for the purposes of the present invention. As will be discussed in detail below, since K and T can be extremely large, searching for the few critical combinations of k and t require an efficient approach.

As mentioned above, an important aspect of the methodology of the present invention is the realization that $C_{k,t}$ is a monotonically non-increasing function of k and a monotonically non-decreasing function of t. That is, as k increases, the value of $C_{k,t}$ cannot increase (and, most likely, will decrease) and as t increases, the value of $C_{k,t}$ cannot decrease (and, most likely, will increase). The proof of this assertion is found in a later section of this specification. For present purposes, this property will be presumed.

Returning to the one-dimensional problem outlined above, the following divide-and-conquer process is used to find critical threshold values k* for a fixed value of t. The process, as outlined in the flowchart of FIG. 2, presumes that the minimum and maximum values of events are known ($K_{min}$ and $K_{max}$), and a desired ratio value θ has been defined by the user (along with the fixed value of t). Following with the previous discussion of "coverage", the value of θ is associated with noting when there has been an 'abrupt change' in the coverage metric. In performing the following analysis, a pair of lemmas are utilized (the proof of these lemmas included in the appendix on monotonicity):

Lemma A: For a fixed t, if a sub-interval $X=[k_s, k_e]$ contains a point $k^*$ such that $C_{k^*,t}/C_{k^*+1,t} \geq \theta$, then $C_{ks,t}/C_{ke+1,t} \geq \theta$, where $k_s$ defines the 'starting' value of k along the sub-interval and $k_e$ defines the 'ending' value of k along the same interval.

Lemma B: For a fixed t, if for a sub-interval $X=[k_s, k_e]$, the ratio $C_{k^*,t}/C_{k^*+1,t} < \theta$, then that sub-interval does not contain any point $k^*$.

Figure 2:
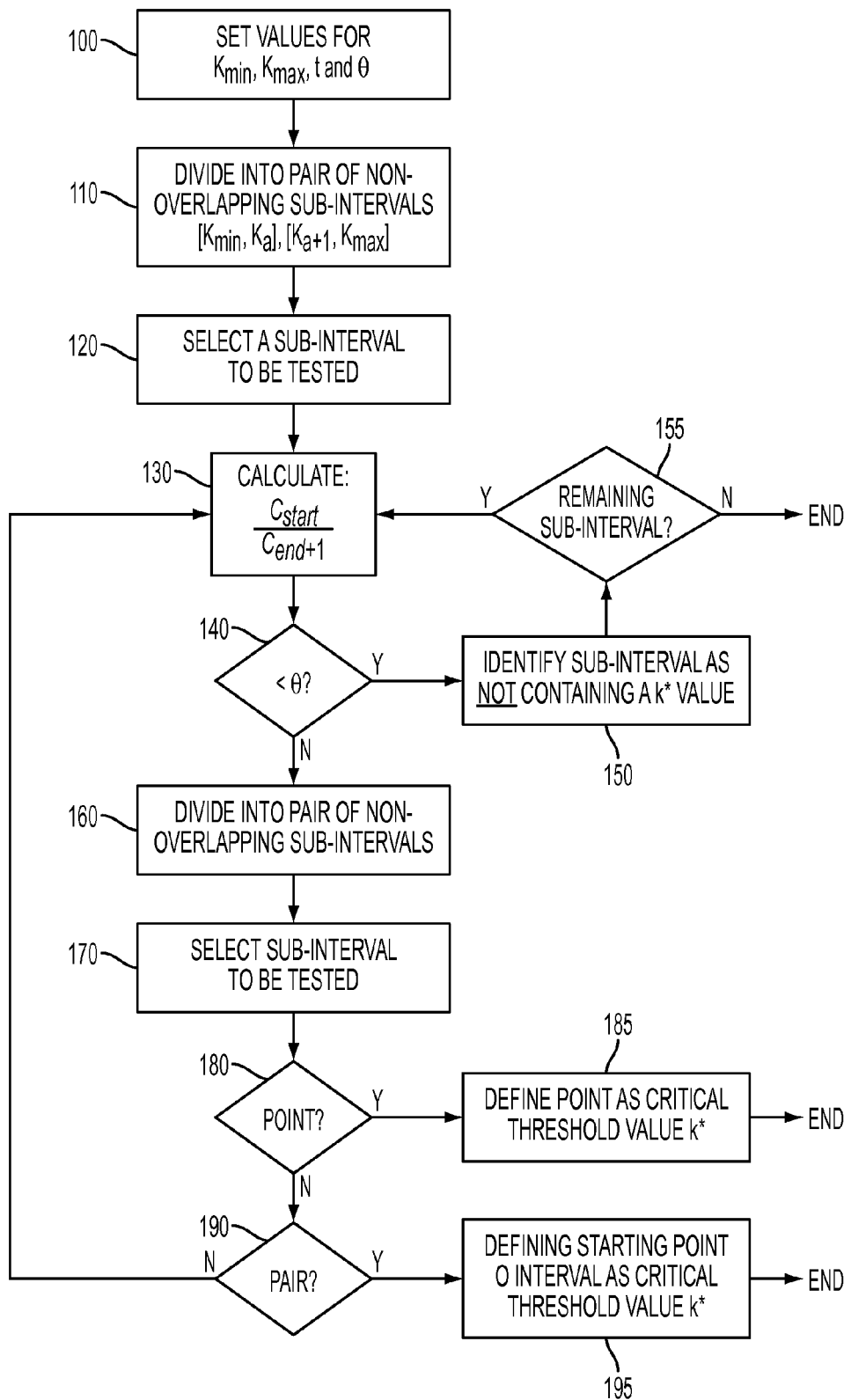
FIG. 2 is a flowchart illustrating an exemplary method of the present invention.
Figure 3:
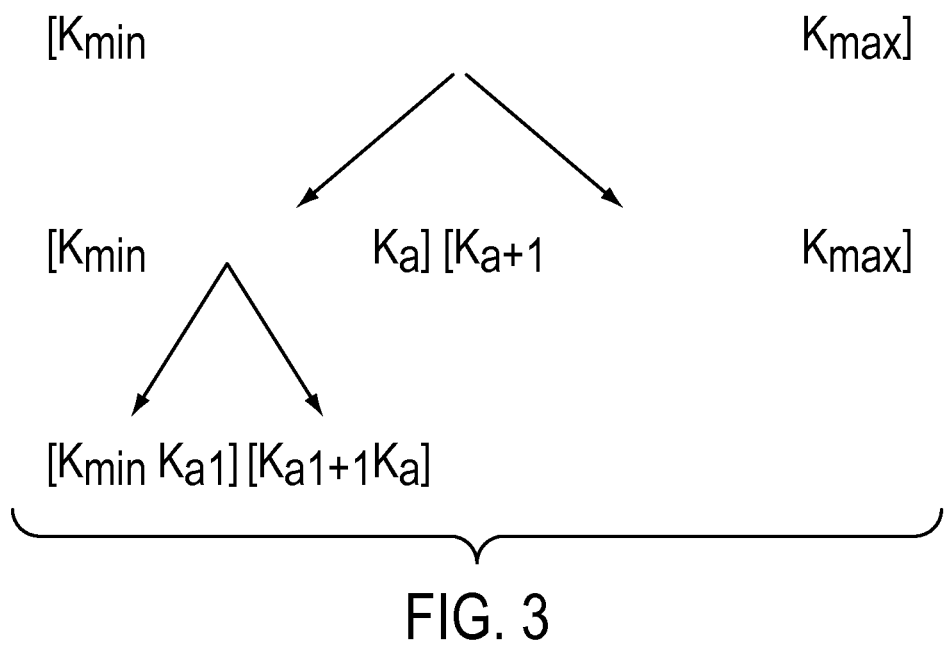
FIG. 3 is a one-dimensional depiction of the partitioning of the event interval during the divide-and-conquer searching technique utilized in the method of the present invention.

Looking at the flowchart of FIG. 2, the process begins with a definition of the values of $K_{min}$, $K_{max}$, t and $\theta$ (step 100). Next, the complete interval of K is divided into a pair of non-overlapping sub-intervals (step 110). As will be discussed below, this division can either be 'deterministic' (forming two sub-intervals of equal length) or 'random' (forming two sub-intervals at a randomly-determined point). FIG. 3 illustrates one exemplary configuration of this split, defining a pair of sub-intervals I and II. Referring back to the flowchart of FIG. 2, the next step in the process is to select one of the sub-intervals to be analyzed (step 120) and calculate the coverage ratio for the starting/(ending+1) values of k (step 130). For example and with reference to FIG. 3, if sub-interval I is selected, then the value of $C_{kmin}/C_{k\alpha+1}$ is calculated. The calculated ratio is then compared to the defined value of $\theta$ (step 140). If the ratio is less than $\theta$, then it is safe to presume that there is no possible value of $k^*$ in that sub-interval (in keeping with Lemma B), and that sub-interval is defined as returning a "no candidate value" result (step 150). As a result of this "no candidate" decision, there is no need to search further sub-intervals within this interval—significantly reducing the search time and complexity compared to the straightforward, naive searching/comparing process of every point in this sub-interval. A query is then made to determine if there is another sub-interval to be analyzed at this level (step 155) and, if so, the process returns to step 120 to select this sub-interval. Otherwise, the process is terminated.

Presuming that the result of the comparison in step 140 yields the result that the ratio is greater than or equal to $\theta$, the given sub-interval is identified as "possibly" containing a value of $k^*$. It is to be noted that it cannot be presumed that a value of $k^*$ exists along this sub-interval, since there may be a sufficient change in coverage across the extent of the sub-interval from the "start" to the "end" that the $\theta$ threshold is reached, or even exceeded. In accordance with the present invention, the divide-and-conquer search technique is continued to be applied to any sub-interval so identified, probing further and further into smaller sub-intervals until one or more specific "point" values of $k^*$ is/are identified.

Referring back to the "no" output from step 140 in flowchart of FIG. 2, the process continues with dividing the positively-identified sub-interval into another pair of non-overlapping sub-intervals (step 160). FIG. 3 illustrates this step 160, showing first sub-interval I being split into a pair of non-overlapping sub-intervals III and IV. A sub-interval for further analysis is then selected (step 170). At this point in the process, tests are performed to determine if the process has reached the point where the sub-interval has become so small as to contain only a single point (test at step 180) or a pair of points (test at step 190). Looking at step 180, if the sub-interval has shrunk to a single point, that point is then identified as a critical threshold value $k^*$ (step 185). Similarly, looking at step 190, if the sub-interval has become a pair of adjacent points, the starting point is defined as a critical threshold value $k^*$ (step 195).

Presuming that interval III fails both of these tests, the process returns to step 130 to calculate the coverage ratio for the endpoints of sub-interval III, then performing the comparison of step 140. The "divide-and-conquer" process continues on positively-identified sub-intervals in the same manner, with the length of the intervals shortening considerably in each iteration.

As mentioned above, the actual process of dividing a given interval into a pair of sub-intervals creates sub-intervals of different lengths as a function of which method is used to create the sub-intervals. If a "deterministic" approach is used, a given interval of width w is divided into a pair of equal-length sub-intervals of width w/2. If a "random" approach is used, a given interval of width w is divided into a first sub-interval of width p (0<p<1) and a second sub-interval of width (1−p)w. If both sub-intervals in the deterministic approach pass the $\theta$ test, the sub-intervals are probed serially. If both sub-intervals in the random approach pass the $\theta$ test, the smaller sub-interval is first probed. The smaller sub-interval is chosen first since if it contains a point $k^*$, it will be found in fewer iterations; and, if it does not contain any point $k^*$ (and falsely passed the initial $\theta$ test), the process backtracks after fewer iterations. The specific steps of "dividing into sub-intervals" (steps 110 and 160 in the flowchart) are thus performed differently depending on whether the deterministic or random approach is being utilized. Further, if the random approach is being used, the 'select' function in steps 120 and 170 will always "select" the smaller interval first.

It is to be understood that the process as outlined above and shown in the flowchart of FIG. 2 will perform to follow through any particular sub-interval that passes the $\theta$ test until either the test fails, or a critical threshold value $k^*$ is identified. The process then returns to the highest-level sub-interval that has not been analyzed and the steps of searching for a value of $k^*$ continues in the same manner.

The more general, two-dimensional problem needs to perform searches over the entire range of possible values of k and possible values of t. The following pair of lemmas, extensions from Lemmas A and B, are used in the two-dimensional search:

Lemma C: If a sub-range $X=[k_s,k_e] \times [t_s,t_e]$ contains a point $(k^*,t^*)$ such that $C_{k^*,t}/C_{k^*+1,t} \geq \theta$, then $C_{ks,te}/C_{ke+1,ts} \geq \theta$; and Lemma D: If for a sub-range $X=[k_s,k_e] \times [t_s,t_e]$, $C_{ks,te}/C_{ke+1,ts} < \theta$, then it does not contain any point (k,t) such that $C_{k,t}/C_{k+1,t} \geq \theta$.

Figure 4:
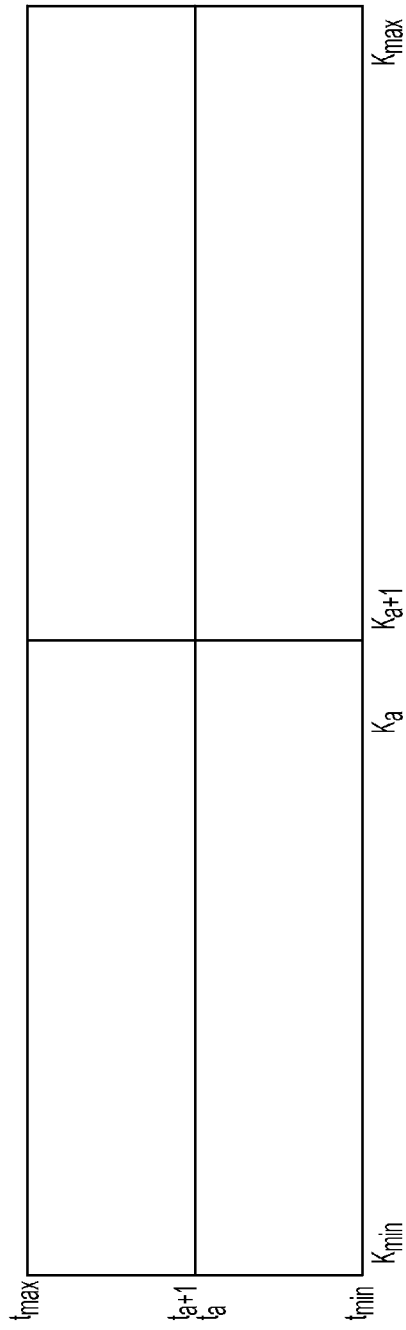
FIG. 4 is a two-dimensional depiction of an initial partition in (k,t)-space for implementing a two-dimensional search in accordance with the present invention, employing a deterministic search approach.
Figure 5:
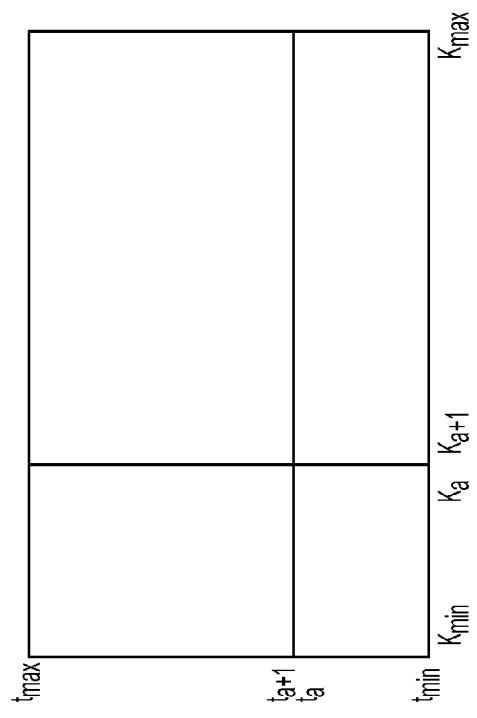
FIG. 5 is a two-dimensional depiction of an initial partition in (k,t)-space for implementing a two-dimensional search in accordance with the present invention, employing a random search approach.
Figure 6A:
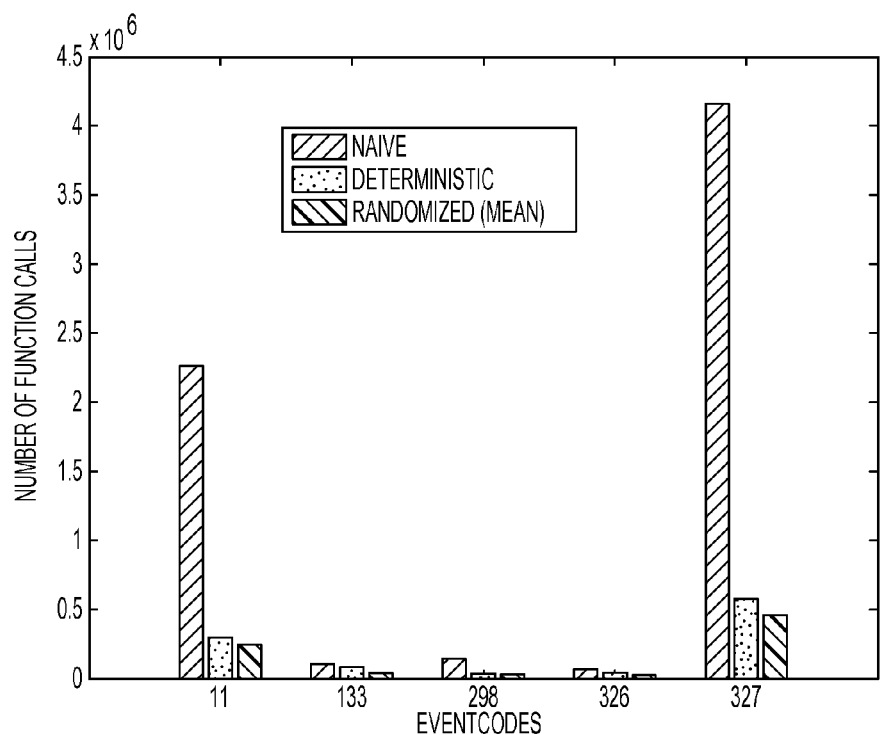
FIGS. 6(a)-(g) contain bar charts illustrating the number of function calls required to find critical threshold pairs, comparing the naïve approach, the deterministic approach and the randomized approach.
Figure 6B:
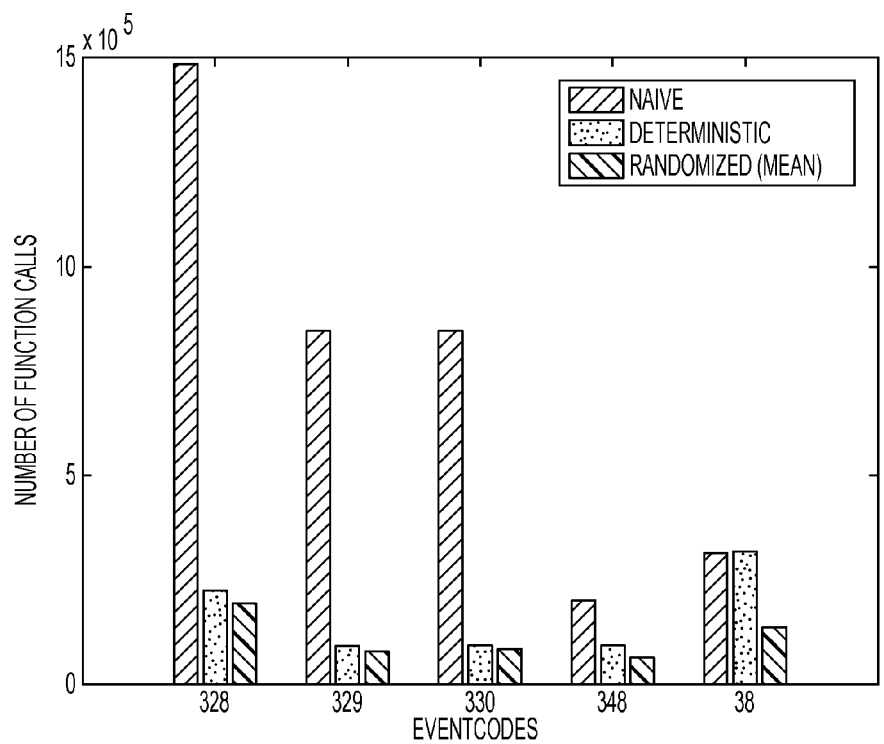
Figure 6C:
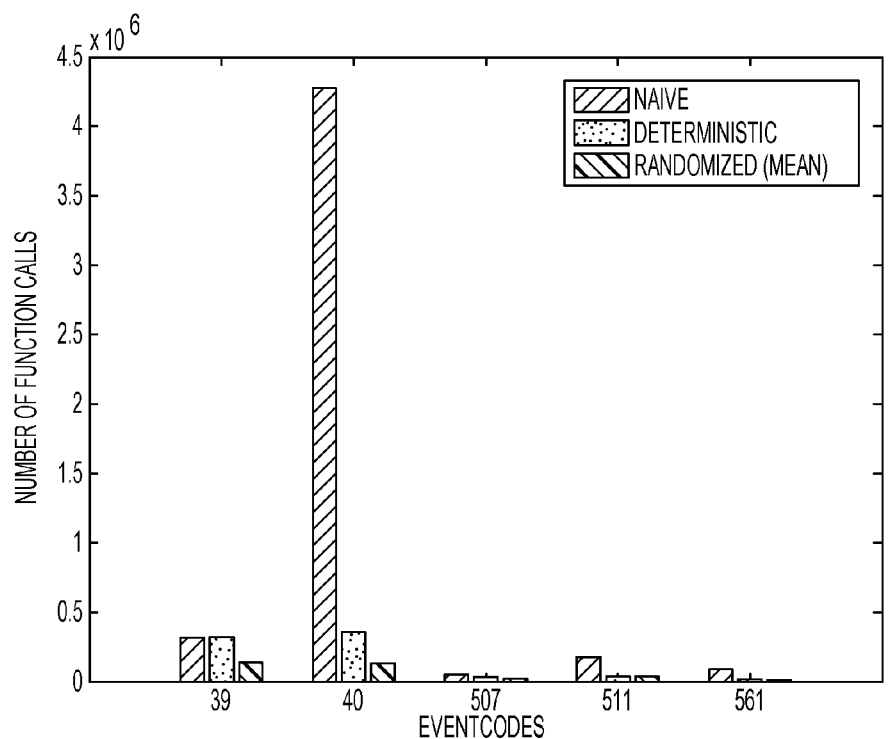
Figure 6D:
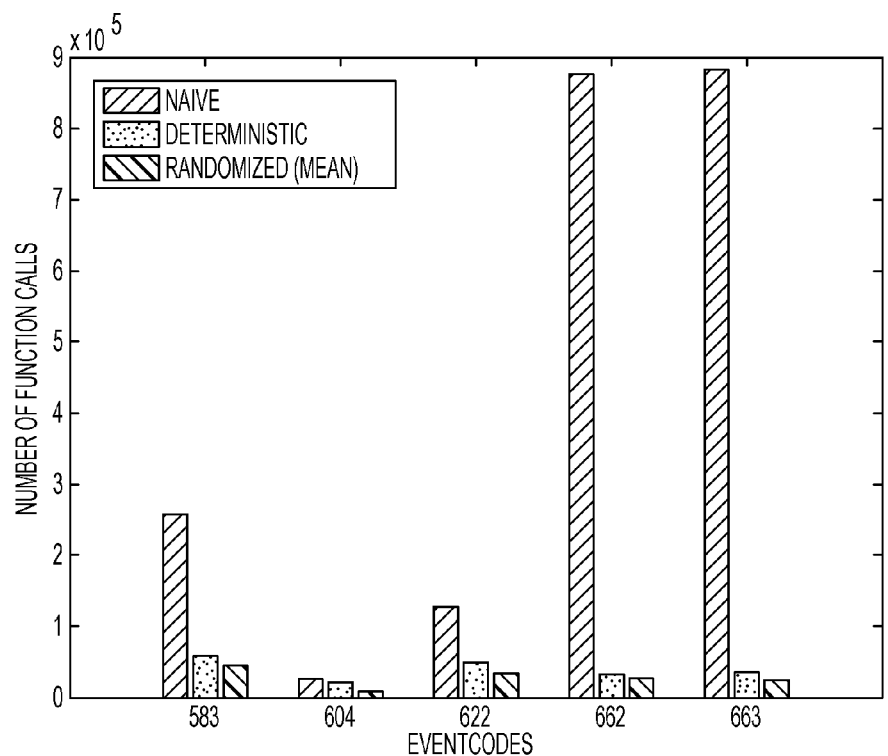
Figure 6E:
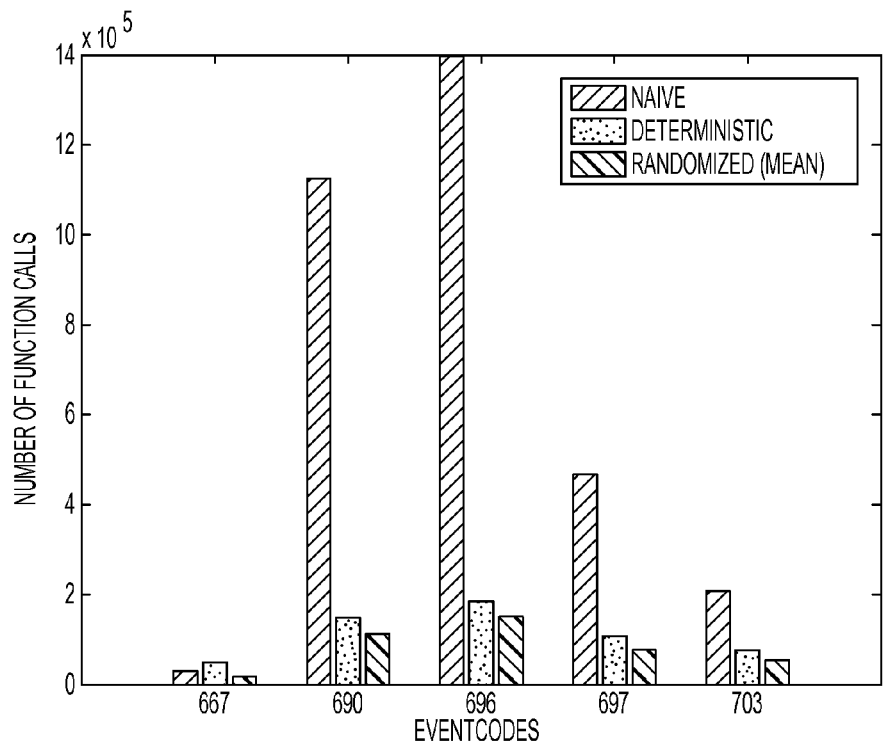
Figure 6F:
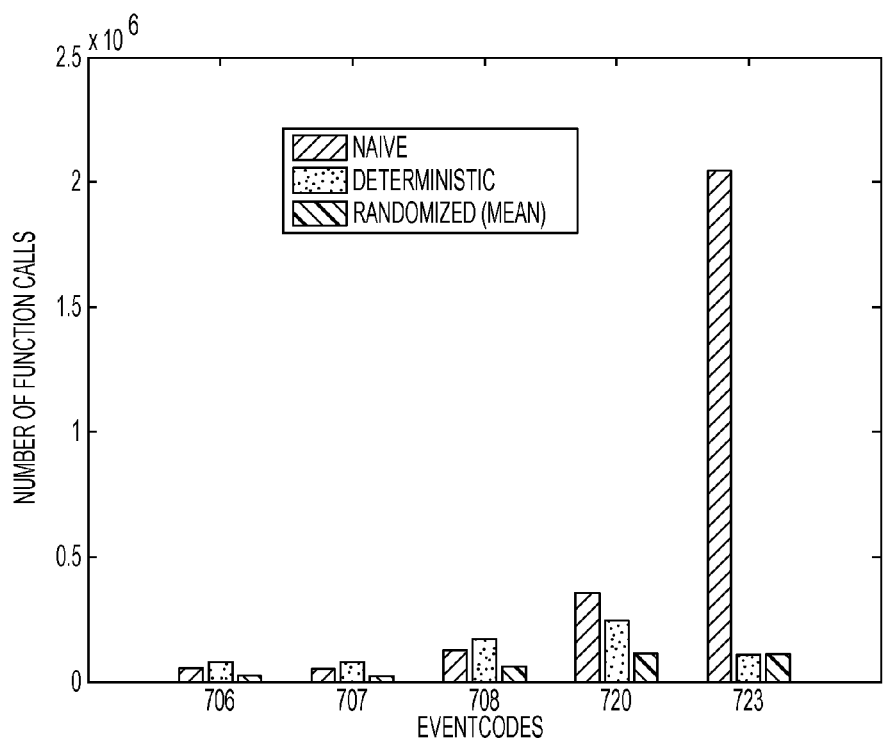
Figure 6G:
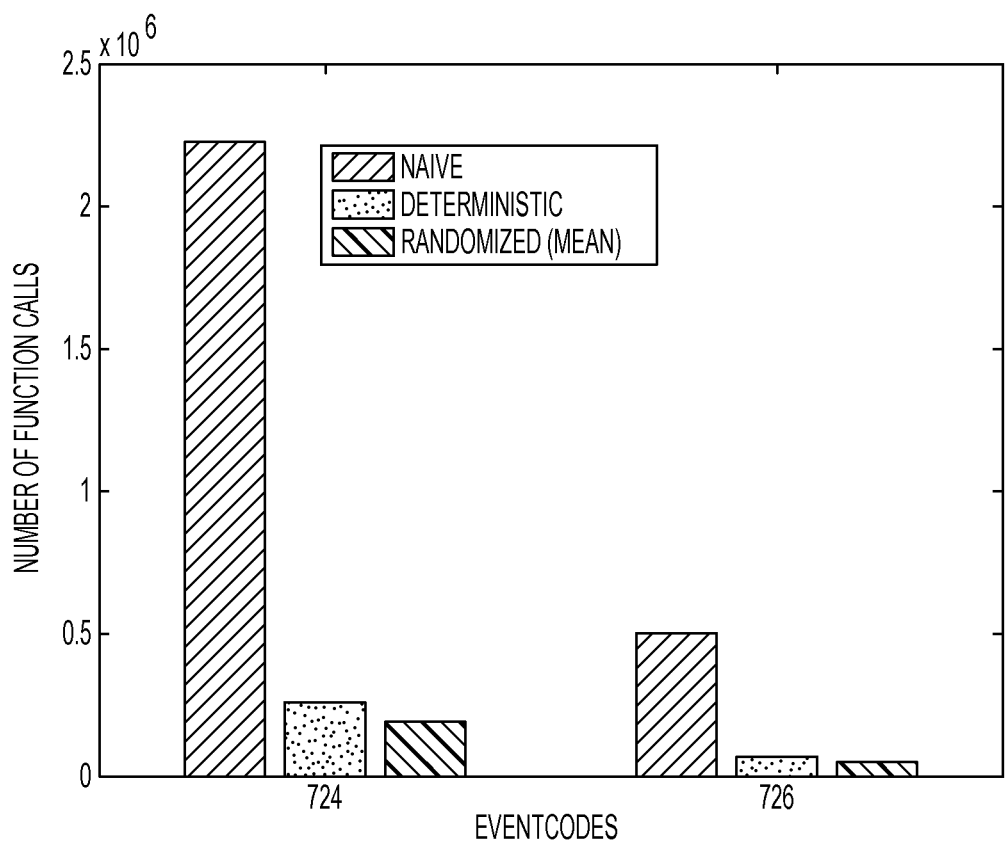

In applying the "divide-and-conquer" methodology outlined above, a set of four quadrants are formed and probed. FIG. 4 illustrates the application of the deterministic approach to evaluating this two-dimensional problem, where four quadrants of equal area are formed. FIG. 5 illustrates the application of the random approach, the four quadrants being of different areas. As with the one-dimensional problem, it is most efficient to first probe the smallest quadrant if using the random approach, since a finding of $k^*,t^*$ will happen quicker. Indeed, regardless of which approach is used, a point will come where one of the dimensions will have arrived at a solution. When that occurs, the remainder of the process reverts to the one-dimensional problem described above.

Application to a Dataset:

Both the deterministic and randomized divide-and-conquer approaches were utilized with a test dataset, the results compared to finding the best critical thresholds for $k^*$ and $t^*$ using the straightforward naïve approach. Medical equipment, capable of generating 32 different event codes, were evaluated. The values of $T_{min}=1$ minute, $T_{max}=100$ minutes, $K_{min}=2$ and $K_{max}=100$ were selected (for each of the event codes).

The coverage metric $C_{k,t}$ was computed for each combination of k and t (for each event code e) and stored in a hash table with a key of e|k|t. These stored values can then be used to calculate $C_{k,t}/C_{k+1,t}$ values, as needed. It is to be noted that once the coverage metric reached a value of 0 (indicating no event codes present in the time window being tested), no computations for values of k larger than the value associated with this "0" needed to be evaluated (obvious from the monotonicity of the coverage metric).

With the evaluated dataset, the maximum value of $C_{k,t}/C_{k+1,t}$ (and hence θ) for the different event codes varied between 1.55 and 55, with 23 of the 32 values being 10 or less. While most of the event codes reported a single pair (k*,t*), there were two event codes that reported a single value of k* for a sequence of separate t values within a contiguous range. This is reasonable since, by definition, for $t_1 \leq t_2$, a $(k,t_1)$-bursty window also qualifies as a $(k,t_2)$-bursty window.

In proceeding with both the deterministic and random approaches, the number of calls to the "coverage" process (table I) for the naïve approach was compared with both approaches. The plots of these comparisons are shown in FIG. 6, which shows that for all but one event code, the mean number of function calls for the randomized heuristic is lower than the number of function calls for the deterministic approach. The probable reason for this is that after partitioning the original interval, when the four sub-intervals are unequal, if the smallest does not contain (k*,t*), then it has less of a chance of falsely passing the test of the two-dimensional search.

In reviewing the bar charts of FIG. 6, let $N_N$, $N_D$ be defined as the number of function calls for the naïve and deterministic approaches, and $N_R$ be defined as the mean number of function calls for the randomized approach. The savings S with respect to the naïve approach can then be measured as follows:

$$S = \frac{N_N - \min(N_D, N_R)}{N_N}.$$

FIGS. 6(a)-(g) provide a comparison of $N_N$, $N_D$ and $N_R$ for all of the 32 event codes in this dataset example, with the event codes on the X-axis and the number of function calls on the Y-axis.

Monotonicity of the Coverage Function:

As mentioned above, an important aspect of the defined "coverage" parameter $C_{k,t}$ is that it is monotonic non-increasing in k and monotonic non-decreasing in t. The proof of this concept is shown below, through the following series of observations and lemmas:

Observation: For k>1, an event e with timestamp $t_e$ is not covered by any (k,t)-bursty window iff $t_{e'} < t_e - t$ and $t_{e''} > t_e + t$, where e' and e'' are the immediately preceding and succeeding events of e in S.

It is noted that the above observation assumes e has both a preceding and a succeeding event. If, instead, e is the first event in the sequence, then only the second condition ($t_{e''} > t_e + t$) is relevant. Similarly, if e is the last event in the sequence, then only the first condition ($t_{e'} < t_e - t$) is relevant.

Lemma: For k>1, if an event e is covered by some $(k,t_1)$-bursty window, then for any $t_2 \geq t_1$, the same event e is also covered by some $(k,t_2)$-bursty window.

Proof: This lemma may be proved by contradiction, as follows—Suppose an event e is covered by some $(k,t_1)$-bursty window, but for some $t_2 \geq t_1$, it is not covered by any $(k,t_2)$-bursty window. Then, in accordance with the above observation, $t_{e'} < t_e - t_2$ and $t_{e''} > t_e + t_2$. However, it is given that $t_2 > t_1$, so together these imply that $t_{e'} < t_e - t_1$ and $t_{e''} > t_e + t_1$. In light of the observation, this implies that e is not covered by any $(k,t_1)$-bursty window, which is a contradiction.

Theorem: $C_{k,t}$ is a monotonically non-decreasing function of t, that is:

$$t_1 \leq t_2 \Rightarrow C_{k,t_1} \leq C_{k,t_2}$$

Proof: Again, this is proved by contradiction. Suppose $t_1 \leq t_2$ but $C_{k,t_1} > C_{k,t_2}$. Let $S_{k,t}$ be the set of events that are reported in some (k,t)-bursty window, that is, $$C_{k,t} = \frac{|S_{k,t}|}{n}.$$

Consider some event $e \in S_{k,t_1} - S_{k,t_2}$ and presume that event e is covered by some $(k, t_1)$-bursty window, but not by any $(k, t_2)$-bursty window, where $t_2 \geq t_1$. According to the above Lemma, this is a contradiction.

In similar fashion, it can be shown that $C_{k,t}$ is monotonic in k.

Lemma: For any $k_1$, $k_2$ with $k_2 \geq k_1$, any $(k_2, t)$-bursty window also gets reported as a $(k_1, t)$-bursty window Proof: While searching for a (k,t)-bursty window, the process of the present invention includes as many events (e) within the window as possible (regardless of the value of k), as long as the difference between the timestamps associated with the first event and the last event within the window does not exceed t ($t_{e2} - t_{e1} \leq t$). This implies that if a window is reported as bursty for $k = k_2$, it will also be reported as bursty for any $k_1 \leq k_2$.

Theorem: $C_{k,t}$ is a monotonically non-increasing function of k, that is:

$$k_1 \leq k_2 \Rightarrow C_{k_1,t} \leq C_{k_2,t}$$

Proof: Once again, this is proved by contradiction. Suppose $k_1 \leq k_2$ but $C_{k_1,t} < C_{k_2,t}$. As with the above theorem, let $S_{k,t}$ be the set of events that are reported in some (k,t)-bursty window, that is, $C_{k,t} = |S_{k,t}|/n$. Consider some event $e \in S_{k_2,t} - S_{k_1,t}$ and presume that event e is covered by some $(k_2, t)$-bursty window, but not by any $(k_1, t)$-bursty window, where $k_1 \leq k_2$. According to the above Lemma, this is a contradiction, since any $(k_2,t)$-bursty window is always also reported as a $(k_1, t)$-bursty window.

Proofs of Lemmas A, B, C and D

As discussed in an earlier portion of the specification:

Lemma A: For a fixed t, if a sub-interval $X = [k_s, k_e]$ contains a point k* such that $C_{k*,t}/C_{k*+1,t} \geq \theta$, then $C_{k_s,t}/C_{k_e+1,t} \geq \theta$, where $k_s$ defines the 'starting' value of k along the sub-interval and $k_e$ defines the 'ending' value of k along the same interval.

Proof: Note that $$k_s \leq k^* < k^*+1 \leq k_e+1.$$

By knowing that $C_{k,t}$ is monotonically non-decreasing in k, this implies that $$C_{k_s,t} \geq C_{k^*,t} \geq C_{k^*+1,t} \geq C_{k_e+1,t}$$

Combining $C_{k_s,t} \geq C_{k^*,t}$ and $C_{k_e+1,t} \leq C_{k^*+1,t}$ gives $$\frac{C_{k_s,t}}{C_{k_e+1,t}} \geq \frac{C_{k^*,t}}{C_{k^*+1,t}} > \theta.$$

Lemma B: For a fixed t, if for a sub-interval $X=[k_s, k_e]$, the ratio $C_{k^*,t}/C_{k^*+1,t}<\theta$, then that sub-interval does not contain any point $k^*$.

Proof: Lemma B is the contra-positive of Lemma A, thus proved by the same steps.

Lemma C: If a sub-range $X=[k_s,k_e]\times[t_s,t_e]$ contains a point $(k^*,t^*)$ such that $C_{k^*,t}/C_{k^*+1,t}\geq\theta$, then $C_{k,te}/C_{ke+1,ts}\geq\theta$.

Proof: From the aspects of monotonicity discussed above, $t_e \geq t^* \Rightarrow C_{k,te} \geq C_{k,t^*}$, and $t_s \leq t^* \Rightarrow C_{k+1,ts} \leq C_{k+1,t^*}$. Combining these two results in the follow relation:

$$\frac{C_{k,te}}{C_{k+1,te}} \geq \frac{C_{k,t^*}}{C_{k+1,t^*}} > \theta.$$

Lemma D: If for a sub-range $X=[k_s,k_e]\times[t_s,t_e]$, $C_{ks,te}/C_{ke+1,ts}<\theta$, then it does not contain any point $(k,t)$ such that $C_{k,t}/C_{k+1,t}\geq\theta$.

Proof: Lemma D is the contra-positive of Lemma C, thus proved by the same steps.

Specific Pseudo Code Processes

The process outlined in the following pseudo code Table I can be used to compute the coverage $C_{k,t}$ for a given sequence of timestamps $S=(t_{e1}, t_{e2}, \ldots, t_{en})$, a lower bound on k and an upper bound on the window length t.

TABLE I

```
Algorithm 1: ComputeCoverage (S = (t_e1, t_e2,...,t_en),t,k)
   Output: C_{k,t}: the fraction of events that are in some (k,t)-bursty window
1  n ← |S|
2  initialize a bitmap (b_1, b_2, ..., b_n) to all zeros;
   /* sliding window is [s,...,f], s ∈ {1,...,n}, f ∈ {1,...,n} */
3  s ← 0, f ← 0;
   //Note: t_ei is the i^th timepoint in S
4  while t_ef < t_es + t and f < n do
5  |  f ← f + 1
6  end
7  if t_ef > t_es + t then
8  |  f ← f - 1
9  end
10 while f < n do
11 |  n_w = f - s + 1
12 |  if n_w ≥ k then
13 |  |  set the bits (b_s, ..., b_f) to 1;
14 |  end
15 |  s_p = s; f_p = f
16 |  while s ≤ s_p and f ≤ f_p do
17 |  |  s ← s + 1
18 |  |  while t_ef < t_es + t and f < n do
19 |  |  |  f ← f + 1
20 |  |  end
21 |  |  if t_ef > t_es + t then
22 |  |  |  f ← f - 1
23 |  |  end
24 |  end
25 end
   /* If the last point is within the last window, it will be counted.
      Otherwise, it is an isolated point and hence not
      interesting. */
26 if f = n then
27 |  n_w ← f - s + 1
28 |  if n_w ≥ k then
29 |  |  set the bits (b_s, ..., b_f) to 1;
30 |  end
31 end
32 C_{k,t} ← Σ_{j=1}^n = b_j/n;
33 return C_{k,t}
```

As discussed above, even if a single timestamp $t_{ei}$ is included in multiple (k,t)-bursty windows, its contribution to the numerator of $C_{k,t}$ is only "1". In accordance with the process outlined in Table I, a bitmap $(b_1, b_2, \ldots, b_n)$ of length n is created, one bit for each timestamp in S. The window is "slid" over S, marking the starting and finishing points of the sliding window by s and f, respectively. Once s is fixed, f is incremented (see lines 5-10 and 19-24 in the above pseudo-code) until one of the following two instances takes place: (1) the timestamp of the event indexed by f, $t_{ef}$ is no longer within the boundary of the current window (i.e., $t_{ef}>t_{es}+t$), or (2) all of the timepoints have been exhausted (i.e., f>n).

Once all of the timepoints in a particular window have been picked up, a check is made (lines 13, 29) to determine if the number of events in the current window exceeds the threshold k. If it does, then the bits in the sub-sequence are set to "1", indicating the presence of a bursty window.

The process outlined in the following pseudo code Table II is exemplary of a one-dimensional search process over an interval $[k_s, k_e]$ for a fixed value of t.

TABLE II

```
Algorithm 2: RandomSearch k* (S = (t_e1, t_e2, ..., t_en), t, k_s, k_e, θ)
   /* C_{k,t} is always computed invoking ComputeCoverage(S,t,k) */
1  if k_s = k_e then
   |  /* Interval has reduced to a single point         */
2  |  if C_{ks+1,t} > 0 then
3  |  |  r ← C_{ks,t}/C_{ks+1,t};
4  |  |  if r ≥ θ then
5  |  |  |  output (k_s,t) as a critical threshold pair;
6  |  |  end
7  |  end
8  |  return
9
10    else if k_e - k_s = 1 then
   |  /* Interval of length 2. Just check at two points individually */
11 |  foreach i ∈ [k_s, k_e] do
12 |  |  if C_{i+1,t} > 0 then
13 |  |  |  r ← C_{i,t}/C_{i+1,t};
14 |  |  |  if r ≥ θ then
15 |  |  |  |  output (i,t) as a critical threshold pair;
16 |  |  |  end
17 |  |  end
18 |  end
19 |  end
20    else
   |  /* Interval of width 3 or more. The function U([a,b])
      returns a number
   |     uniformly at random in [a,b] */
21 |  kq ← U([k_s, k_e - 1]);
22 |  between [k_s, k_q] and [k_{q+1}, k_e], let [k_s^{big}, k_e^{big}] be the
      bigger window and
   |  [k_s^{small}, k_e^{small}] be the smaller;
23 |  if C_{k_e^{small}+1,t} > 0 then
24 |  |  r_{small} ← C_{k_s^{small},t} / C_{k_e^{small}+1,t};
25 |  |  if r_{small} ≥ θ then
26 |  |  |  RandomSearchk*(S,t,k_s^{small},k_e^{small},θ);
27 |  |  end
28 |  end
29 |  if C_{k_e^{big}+1,t} > 0 then
30 |  |  r_{big} ← C_{k_s^{big},t} / C_{k_e^{big}+1,t};
31 |  |  if r_{big} ≥ θ then
32 |  |  |  RandomSearchk*(S,t,k_s^{big},k_e^{big},θ);
33 |  |  end
34 |  end
35 end
```

The pseudo-code of Table II follows the process described above in the flowchart of FIG. 1, and is called as a subroutine in the two-dimensional problem in solving for values of k*, once the range of t values reduces to a single point. The pseudo-code of Table III is similar, presuming a fixed value of k and searching for t.

TABLE III

```
Algorithm 3: RandomSearch t* (S = (t_e1, t_e2, ..., t_en), k, t_s, t_e, θ)
    /* C_{k,t} is always computed invoking ComputeCoverage(S,t,k) */
 1  if t_s = t_e then
        /* Interval has reduced to a single point */
 2  |   if C_{ks+1,t} > 0 then
 3  |   |   r ← C_{k,ts}/C_{k+1,ts};
 4  |   |   if r ≥ θ then
 5  |   |   |   output (k,t_s) as a critical threshold pair;
 6  |   |   end
 7  |   end
 8  |   return
 9
10  else if t_e − t_s = 1 then
        /* Interval of length 2. Just check at two points individually */
11  |   foreach i ∈ [t_s, t_e] do
12  |   |   if C_{k+1,i} > 0 then
13  |   |   |   r ← C_{k,i}/C_{k+1,i};
14  |   |   |   if r ≥ θ then
15  |   |   |   |   output (k,i) as a critical threshold pair;
16  |   |   |   end
17  |   |   end
18  |   end
19  end
```

TABLE III-continued

```
20  else
        /* Interval of width 3 or more. The function U([a,b])
        returns a number
        uniformly at random in [a,b] */
21  |   t_q ← U([t_s, t_e − 1]);
22  |   between [t_s, t_q] and [t_{q+1}, t_e], let [t_s^{big}, t_e^{big}] be the
        bigger window and
        [t_s^{small}, t_e^{small}] be the smaller;
23  |   if C_{k+1,t_s}^{small} > 0 then
24  |   |   r_{small} ← C_{k,t_e}^{small}/C_{k+1,t_s}^{small}
25  |   |   if r_{small} ≥ θ then
26  |   |   |   RandomSearchk*(S,t,t_s^{small},t_e^{small},θ);
27  |   |   end
28  |   end
29  |   if C_{k+1,t_s}^{big} > 0 then
30  |   |   r_{big} ← C_{k,t_e}^{big}/C_{k+1,t_s}^{big}
31  |   |   if r_{big} ≥ θ then
32  |   |   |   RandomSearchk*(S,t,t_s^{big},t_e^{big},θ);
33  |   |   end
34  |   end
35  end
```

Lastly, the pseudo-code shown in Table IV performs the search over the two-dimensional interval $[k_s, k_e] \times [t_s, t_e]$ to solve the basic problem of finding critical threshold pairs $(k^*, t^*)$.

TABLE IV

```
Algorithm 4: RandomSearch2D (S=(t_e1, t_e2,...,t_en), k_s, k_e, t_s, t_e, θ)
    /* A rectangle is defined as a four-tuple (t_l,t_h,k_l,k_h), i.e., the set of all
    points in the 2D range [t_l,t_h] x [k_l,k_h]. Its area is defined as
    (t_h − t_l + 1)·(k_h − k_l + 1). */
 1  if t_s = t_e and k_s = k_e then
        /* Rectangle has reduced to a single point */
 2  |   if C_{ke+1,ts} > 0 then
 3  |   |   r ← C_{ks,te}/C_{ks+1,ts};
 4  |   |   if r ≥ θ then
 5  |   |   |   output (k_s,t_s) as a critical pair threshold pair;
 6  |   |   end
 7  |   end
 8  |   return
 9  else if t_s = t_e then
        /* t fixed, rectangle reduced to a single line [k_s, k_e] */
10  |   RandomSearchk*(S, t_s, k_s, k_e, θ)
11  else if k_s = k_e then
        /* k fixed, rectangle reduced to a single line [t_s, t_e] */
12  |   RandomSearcht*(S, k, t_s, t_e, θ)
13  else if t_e − t_s = 1 and k_s − k_e = 1 then
        /* 2x2 rectangle. Check four points individually */
14  |   foreach (i,j) ∈ [k_s, k_e] x [t_s, t_e] do
15  |   |   if C_{i+1,j} > 0 then
16  |   |   |   r ← C_{i,j}/C_{i+1,j};
17  |   |   |   if r ≥ θ then
18  |   |   |   |   output (i,j) as a critical threshold pair;
19  |   |   |   end
20  |   |   end
21  |   end
22  |   return
23  else
        /* Split the rectangle randomly into four quadrants */
24  |   k_q ← U([k_s, k_e − 1)];
25  |   t_q ← U([t_s, t_e − 1]);
26  |   let R be an array of rectangles with R[1] = (t_s, t_q, k_s, k_q),
        R[2] = (t_q+1, t_e, k_s, k_q), R[3] = (t_s, t_q, k_q+1, k_e) and
        R[4] = (t_q +1, t_e, k_q +1, k_e);
27  |   sort R in increasing order of areas of the rectangles;
28  |   for p=1 to 4 do
29  |   |   let (t_l, t_h, k_l, k_h) be the 4-tuple for rectangle R[p] if C_{kh+1,tl} > 0 then
```

TABLE IV-continued

```
30  |  |  |     r ← C_{kl,th}/C_{kh+1,tl};
31  |  |  |     if r ≥ θ then
32  |  |  |     |  RandomSearch2D(S, k_l, k_h, t_l, t_h, θ)
33  |  |  |     end
34  |  |  end
35  |  end
36  end
```

It is to be understood that the present invention, in accordance with at least one presently preferred embodiment, includes elements that may be implemented on at least one general-purpose computer running suitable software programs. These may also be implemented on at least one integrated circuit or part of at least one integrated circuit. Thus, it is to be understood that the invention may be implemented in hardware, software, or a combination of both.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of determining critical thresholds on a number of events (k) and a window length (t) for defining a burst of events in a data stream, the method comprising the steps of:
  defining minimum and maximum values of both k and t;
  calculating a coverage metric $$C_{k,t} = \frac{N_{k,t}}{n},$$

where $N_{k,t}$ is a number of events occurring in some (k,t)-bursty window and n is the total number of events in a data stream;
  searching for at least one $C_{k,t}$ that is abruptly different from its neighboring values; and
  identifying the (k,t) pair for each $C_{k,t}$ which is abruptly different as a critical threshold pair (k*,t*) defining a burst of events.

2. The method according to claim 1, wherein the searching step utilizes a divide-and-conquer approach of partitioning each event interval and window length interval into a pair of sub-intervals, searching for an abruptly different value in each sub-interval.

3. The method according to claim 2 wherein the divide-and-conquer approach employs a deterministic heuristic to divide an interval into a pair of equal length intervals.

4. The method according to claim 2 wherein the divide-and-conquer approach employs a random heuristic to divide an interval into a first interval of length p (0<p<1) and (1−p).

5. The method according to claim 2 wherein the method includes the step of providing a user-defined parameter θ>1 and defining an interval as not containing a critical threshold pair if a ratio $C_{ks,ts}/C_{ke+1, t}<\theta$, where $C_{ks,ts}$ is the coverage metric associated with a starting point of the interval and $C_{ke+1, t}$ is the coverage metric associated with one point beyond an ending point of the interval.

6. A computer system for determining critical thresholds on a number of events (k) and a window length (t) to properly defining a burst of events in a data stream the system comprising:
  a module for defining minimum and maximum values of both k and t;
  a module for calculating a coverage metric $$C_{k,t} = \frac{N_{k,t}}{n},$$

where $N_{k,t}$ is a number of events occurring in some (k,t)-bursty window and n is the total number of events in a data stream;
  a module for searching for at least one $C_{k,t}$ that is abruptly different from its neighboring values; and
  a module for identifying the (k,t) pair for each $C_{k,t}$ which is abruptly different as a critical threshold pair (k*,t*) defining a burst of events.

7. The computer system according to claim 6, wherein the module for searching utilizes a divide-and-conquer approach of partitioning each event interval and window length interval into a pair of sub-intervals, searching for an abruptly different value in each sub-interval.

8. The computer system according to claim 6, wherein the module for identifying the (k,t) pair for that $C_{k,t}$ which is abruptly different as a critical threshold pair (k*,t*) utilizes a user-defined parameter θ, where if $$\frac{C_{k*-1,t*}}{C_{k*,t*}} \geq \theta,$$

(k*, t*) is defined as a critical threshold pair.

9. The computer system according to claim 6, wherein the module for identifying the (k,t) pair for that $C_{k,t}$ which is abruptly different as a critical threshold pair (k*,t*) utilizes a user-defined parameter θ>1 and defining an interval as not containing a critical threshold pair if a ratio $C_{ks,ts}/C_{ke+1, t}<\theta$, where $C_{ks,ts}$ is the coverage metric associated with a starting point of the interval and $C_{ke+1, t}$ is the coverage metric associated with one point beyond an ending point of the interval.

10. A program storage device readable by machine, tangibly embodying a program of instructions executable by the machine to perform method steps for determining critical thresholds on a number of events (k) and a window length (t) for properly defining a burst of events in a data stream, said method comprising the steps of:
  defining minimum and maximum values of both k and t;
  calculating a coverage metric $$C_{k,t} = \frac{N_{k,t}}{n},$$

where $N_{k,t}$ is a number of events occurring in some (k,t)-bursty window and n is the total number of events in a data stream;

searching for at least one $C_{k,t}$ that is abruptly different from its neighboring values; and identifying the (k,t) pair for each $C_{k,t}$ which is abruptly different as a critical threshold pair (k*,t*) defining a burst of events.

* * * * *